Sheet 1-2 Sheets.
J. J. Squire.
Horse Rake.
No 3303 Re issued Feb. 16, 1869
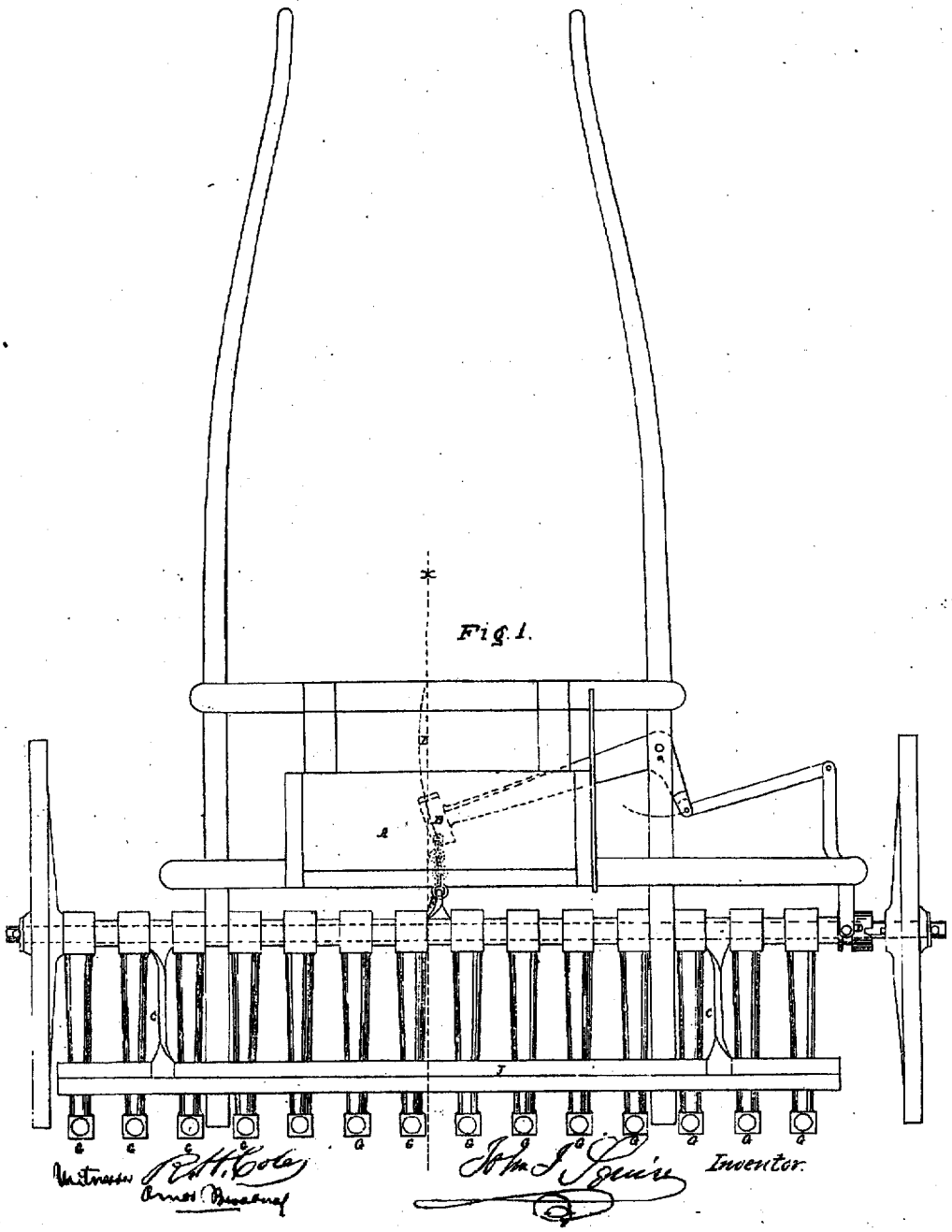

J. J. SQUIRE, Assignor to
Sheet 2. 2 Sheets.
A. Reese.
Horse Rake.
No. 3,303. Reissued Feb. 16, 1869.
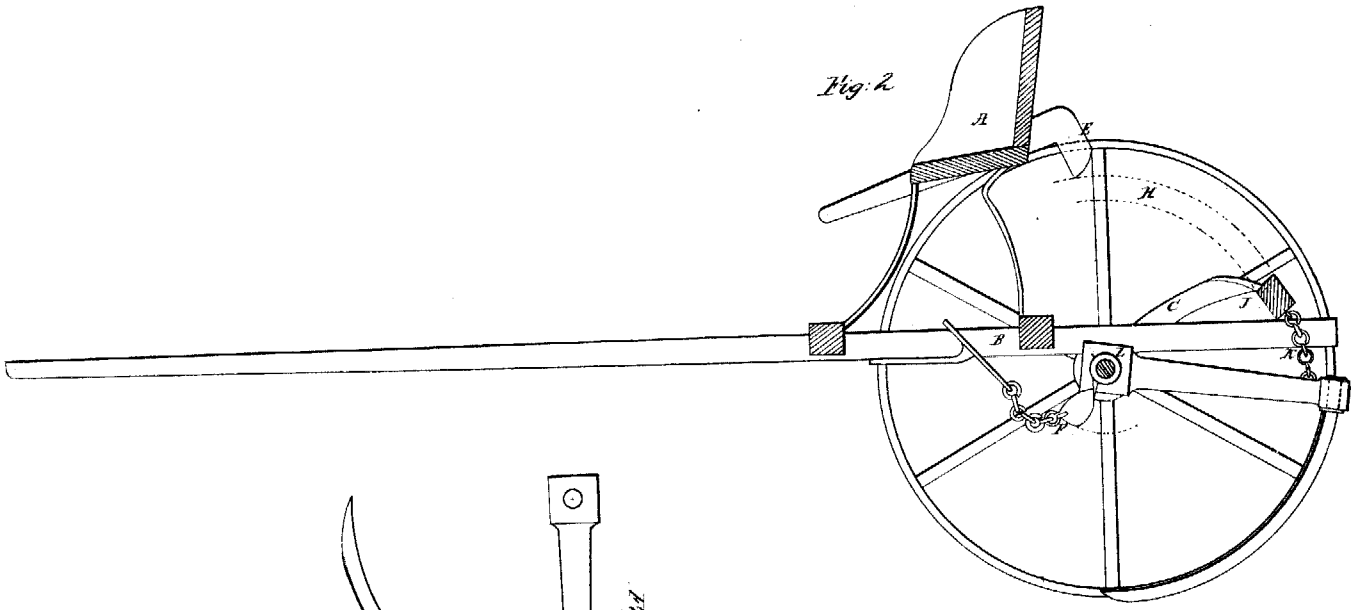
Witnesses.
R. H. Coles
Amos Broadrup.
Inventor.
John J. Squire
N. PETERS, PHOTO-LITHOGRAPHER, WASHINGTON, D. C.

UNITED STATES PATENT OFFICE.

ADAM R. REESE, OF PHILLIPSBURG, N. J., ASSIGNEE OF JOHN J. SQUIRE.

IMPROVEMENT IN HORSE-RAKES.

Specification forming part of Letters Patent No. 16,318, dated December 23, 1856; Reissue No. 3,303, dated February 16, 1869.

*To all whom it may concern:*

Be it known that JOHN J. SQUIRE, of the city of St. Louis, county of St. Louis and State of Missouri, invented certain new and useful Improvements on Harvest-Rakes, to be used in gathering hay or grain, and of which the following is a full and exact description, reference being had to the accompanying drawings and the letters of reference marked thereon.

Figure 1 is a plan view of the rake. Fig. 2 is a transverse section at X, and Fig. 3 is a plan view of a rake-tooth and arm.

The object of this invention is to place an efficient means under the control of the driver in his seat on the machine by which the rake can be lifted from the ground and lowered again at pleasure.

To do this a clutch is placed on the axle and made to work on a feather at D, Fig. 1, and to mesh in a corresponding clutch on the hub of one of the wheels, as shown at D. A lever is connected to this clutch, one end of said lever extending under the seat of the driver, as shown at Figs. 1 and 2, or in some other convenient place where the driver may have it under his control. An arm, F, is placed on the axle, and connected to the end of the lever at B by means of the chains shown also at B. This arm is secured to the axle, so as to turn with it. The arms *c c* are also secured to the axle at one end and to the cross-bar J at the other, to which the arms G G G, &c., are suspended by a chain, shown at K. The arms G G G, &c., are swung on the axle at L, so as to vibrate freely, and, being suspended at the other end, and kept down merely by force of gravity, they can accommodate themselves to any irregularity on the surface of the ground.

Let the rake be in the position shown on the drawing, and let it be desired to raise the arm so that the rake shall discharge its load. The driver, sitting in the seat at A, puts his his foot on end of the lever B, and throws it forward in the direction of the arc I, Fig. 1, which throws the clutch D in gear and causes the axle to turn with the wheels, so that the arms C C and their attachments are made to rise in the direction of the arc H, Fig. 2.

The arms *c c*, having lifted far enough n the above-mentioned direction to discharge the rake of its load, the chain on the lever F acts on the lever B and detaches the clutch D, thus allowing the rake to fall back to its position on the ground.

If it is desired to keep the rake off from the ground it is only necessary to catch it when it is raised up by the clutch under the hook-lever E, Fig. 2.

What is claimed, and sought to be secured by Letters Patent, is—

1. In combination with mechanism for raising the teeth operated by the draft of the team, means for throwing said mechanism into gear, placed under the control of the driver in his seat on the machine.

2. In a two-wheel rake, in which the teeth are raised for discharging the gathered hay by the draft of the team, mechanism, under the control of the driver in his seat on the machine, for causing the draft of the team to raise the teeth, in combination with means for automatically releasing the teeth after the hay has been discharged.

3. A feathered sliding clutch on the rake-head, in combination with a clutch-face or pins on the hub of the carrying or driving-wheel, for the purpose set forth.

4. The clutch D and lever B, for operating the same, in combination with an arm, F, on the rake-shaft, whereby the rake is lifted by the draft of the team and automatically released, substantially as specified.

In testimony whereof, witness my hand this 23d day of December, A. D. 1868.

ADAM R. REESE.

Witnesses:
N. B. SMITH,
ALEX. MAHON.